(12) United States Patent
Ahn et al.

(10) Patent No.: US 11,411,672 B2
(45) Date of Patent: Aug. 9, 2022

(54) METHOD AND APPARATUS FOR DATA TRANSMISSION IN WIRELESS COMMUNICATION SYSTEM

(71) Applicant: ELECTRONICS AND TELECOMMUNICATIONS RESEARCH INSTITUTE, Daejeon (KR)

(72) Inventors: Seok Ki Ahn, Daejeon (KR); Sung Ik Park, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 67 days.

(21) Appl. No.: 17/009,506

(22) Filed: Sep. 1, 2020

(65) Prior Publication Data

US 2021/0067266 A1 Mar. 4, 2021

(30) Foreign Application Priority Data

Sep. 3, 2019 (KR) .................. 10-2019-0109174
Aug. 26, 2020 (KR) .................. 10-2020-0108059

(51) Int. Cl.
*H04L 1/00* (2006.01)
*H04L 1/18* (2006.01)
*H04L 5/00* (2006.01)

(52) U.S. Cl.
CPC .......... *H04L 1/0003* (2013.01); *H04L 1/0013* (2013.01); *H04L 1/1816* (2013.01); *H04L 5/0007* (2013.01); *H04L 5/0053* (2013.01)

(58) Field of Classification Search
CPC ... H04L 1/0003; H04L 1/1816; H04L 5/0053; H04L 5/0007; H04L 1/0013; H04L 1/1812; H04L 1/0067; H04L 1/08; H04L 1/0041; H04L 1/0045; H04L 2001/0093; H04L 1/1819; H04L 5/0055; H04L 1/0061; H04L 1/203; H04L 1/0026; H04L 1/16; H04L 1/0057; H04L 1/0016; H04L 1/1614; H04L 1/0009; H04W 76/11; H04W 72/042; H03M 13/13; Y02D 30/50
See application file for complete search history.

(56) References Cited

U.S. PATENT DOCUMENTS 8,223,712 B2 *  7/2012  Kim .................. H04L 5/0053
                                                       370/329
9,755,814 B2 *  9/2017  Kang ................... H04L 1/0009
(Continued)

FOREIGN PATENT DOCUMENTS

KR   10-2015-0140332 A   12/2015
WO      2014/161631 A1   10/2014
WO      2015/141961 A1    9/2015

*Primary Examiner* — Jung Liu
(74) *Attorney, Agent, or Firm* — Rabin & Berdo, P.C.

(57) ABSTRACT

A method for repetitive transmission of a transport block, performed by a first communication node, may comprise generating a first modulation symbol by performing a modulation operation on a first bit sequence of the transport block; generating a second bit sequence by changing an arrangement order of bits included in the first bit sequence according to a preconfigured rule; generating a second modulation symbol by performing the modulation operation on the second bit sequence; and transmitting, to a second communication node, the first modulation symbol and the second modulation symbol on different data channels.

15 Claims, 6 Drawing Sheets

(56) References Cited

U.S. PATENT DOCUMENTS

| | | | |
|---|---|---|---|
| 2008/0298224 A1* | 12/2008 | Pi | H04L 5/0044 370/204 |
| 2009/0041110 A1* | 2/2009 | Malladi | H04L 1/0067 375/240 |
| 2010/0303016 A1* | 12/2010 | Jin | H04L 27/0008 370/328 |
| 2011/0055652 A1* | 3/2011 | Park | H04L 5/0007 714/748 |
| 2013/0208705 A1* | 8/2013 | Ko | H04B 7/04 370/335 |
| 2015/0271802 A1* | 9/2015 | Kang | H04L 27/34 370/329 |
| 2016/0150541 A1* | 5/2016 | Park | H04W 72/0453 370/329 |
| 2016/0270038 A1* | 9/2016 | Papasakellariou | H04L 1/08 |
| 2017/0180086 A1* | 6/2017 | Xiong | H04L 5/0053 |
| 2018/0042040 A1* | 2/2018 | Chen | H04W 72/1273 |
| 2018/0269899 A1* | 9/2018 | Noh | H03M 13/6306 |
| 2019/0165895 A1 | 5/2019 | Kim | |
| 2019/0174440 A1* | 6/2019 | Kwak | H04L 25/00 |
| 2019/0200348 A1* | 6/2019 | Chae | H04L 1/0023 |
| 2019/0327024 A1* | 10/2019 | Lee | H04L 27/2604 |
| 2019/0334664 A1* | 10/2019 | Guan | H04W 72/12 |
| 2019/0356333 A1* | 11/2019 | Ma | H03M 13/11 |
| 2020/0228254 A1* | 7/2020 | Ma | H04L 1/1825 |
| 2020/0287654 A1* | 9/2020 | Xi | H03M 13/13 |
| 2021/0068082 A1* | 3/2021 | Kodali | H04W 72/04 |
| 2021/0111737 A1* | 4/2021 | Shin | H04L 1/0041 |
| 2021/0288751 A1* | 9/2021 | Jeong | H03M 13/616 |
| 2021/0288765 A1* | 9/2021 | Ibars Casas | H03M 13/29 |

* cited by examiner

FIG. 4
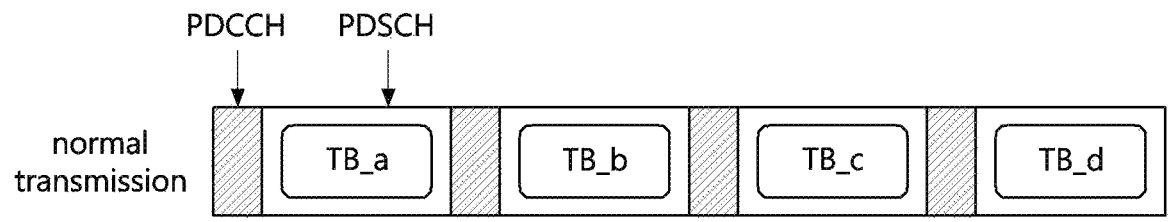
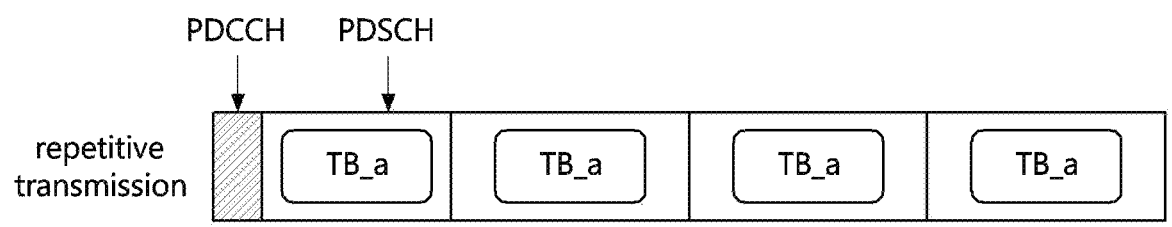
FIG. 5
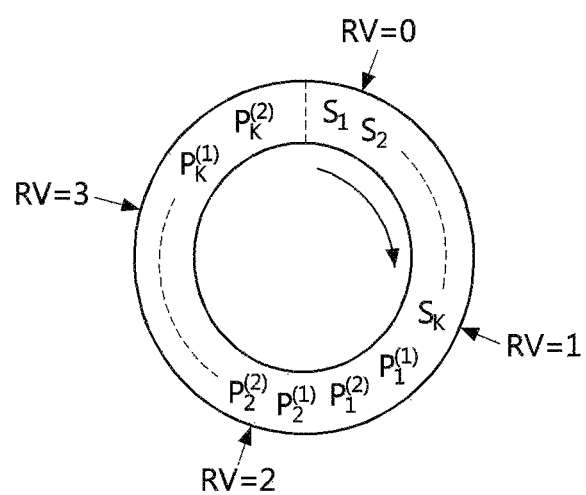

TBS = f (number of REs, MCS)

TBS = f (number of REs, MCS)

TBS = f (number of REs, MCS)

METHOD AND APPARATUS FOR DATA TRANSMISSION IN WIRELESS COMMUNICATION SYSTEM

CROSS-REFERENCE TO RELATED APPLICATIONS

This application claims priority to Korean Patent Applications No. 10-2019-0109174 filed on Sep. 3, 2019, and No. 10-2020-0108059 filed on Aug. 26, 2020 with the Korean Intellectual Property Office (KIPO), the entire contents of which are hereby incorporated by reference.

BACKGROUND

1. Technical Field

The present disclosure relates to a method and an apparatus for data transmission in a wireless communication system, and more specifically, to a method and an apparatus for data transmission based on a repetitive transmission technique for improving reliability of a wireless communication system.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In order to process soaring wireless data after commercialization of the 4G communication system (e.g., communication system supporting the LTE), the 5G communication system (e.g., communication system supporting the NR) using a frequency band (e.g., frequency band of 6 GHz or above) higher than a frequency band (e.g., frequency band of 6 GHz or below) of the 4G communication system as well as the frequency band of the 4G communication system is being considered.

In the wireless communication system such as the 4G or 5G communication system, a repetitive transmission technique may be used as one of techniques for improving reliability of data transmission. For example, a transmitting end may repeatedly transmit the same transport block (TB) through physical channel, and a receiving end may restore the TB based on information received several times. A technique for improving data transmission/reception performance in the wireless communication system to which the repetitive transmission technique is applied as described above may be required.

SUMMARY

In order to solve the above-identified problems, exemplary embodiments of the present disclosure are directed to providing a method and an apparatus for data transmission, which can efficiently transmit and receive data with high reliability by applying a repetitive transmission technique.

According to an exemplary embodiment of the present disclosure for achieving the above-described objective, a method for repetitive transmission of a transport block, performed by a first communication node, may comprise generating a first modulation symbol by performing a modulation operation on a first bit sequence of the transport block; generating a second bit sequence by changing an arrangement order of bits included in the first bit sequence according to a preconfigured rule; generating a second modulation symbol by performing the modulation operation on the second bit sequence; and transmitting, to a second communication node, the first modulation symbol and the second modulation symbol on different data channels.

In the generating of the second bit sequence, the arrangement order of the bits may be changed so that each bit included in the second bit sequence has reliability different from reliability thereof in the first bit sequence.

Each of the first bit sequence and the second bit sequence may include m bits, the m bits in the first bit sequence may include x most significant bits (MSBs) and y least significant bits (LSBs), the x MSBs of the first bit sequence may be configured as LSBs of the second bit sequence according to the preconfigured rule, the y LSBs of the first bit sequence may be configured as MSBs of the second bit sequence according to the preconfigured rule, each of m, x and y may be a natural number, and m may be a multiple of a modulation order of the modulation operation.

Here, x may be 2 and y may be 2.

The method may further comprise generating an n-th bit sequence by changing the arrangement order of the bits included in the first bit sequence according to the preconfigured rule, wherein the preconfigured rule may be based on an offset defined as a function of n and m, n may be a number of bit sequences generated from the first bit sequence up to a corresponding time point, and m may be defined as a function of the modulation order of the modulation operation.

According to an exemplary embodiment of the present disclosure for achieving the above-described objective, a method for repetitive transmission of a transport block, performed by a first communication node, may comprise selecting a first bit sequence from the transport block; transmitting, to a second communication node, a first modulation symbol generated by performing a modulation operation on the first bit sequence on a first data channel; selecting a second bit sequence from the transport block; and transmitting, to the second communication node, a second modulation symbol generated by performing a modulation operation on the second bit sequence on a second data channel, wherein the selecting of the second bit sequence is performed based on an amount of radio resources occupied by the first data channel.

The selecting of the second bit sequence may comprise identifying the amount of radio resources occupied by the first data channel; when the amount of radio resources occupied by the first data channel is equal to a preconfigured first configuration value, selecting bits located after the bits selected as the first bit sequence in the transport block as the second bit sequence; when the amount of radio resources occupied by the first data channel is less than the first configuration value, setting a first configuration redundancy version (RV); and selecting the second bit sequence based on the first configuration RV.

In the setting of the first configuration RV, the first configuration RV may be set at a position immediately after bits transmitted through the data channel.

In the setting of the first configuration RV, the first configuration RV may be set based on a start position of the first bit sequence at the selecting of the first bit sequence and a number of bits transmitted through the data channel.

The amount of radio resource occupied by the data channel may mean a number of orthogonal frequency division multiplexing (OFDM) symbols occupied by the data channel.

According to an exemplary embodiment of the present disclosure for achieving the above-described objective, a method for repetitive transmission of a transport block, performed by a first communication node of a communication system, may comprise performing a modulation operation on a first bit sequence selected from the transport block; generating a first modulation symbol based on an effective code rate calculated based on the modulation operation on the first bit sequence; transmitting, to a second communication node, the first modulation symbol on a first data channel; generating a second modulation symbol by performing a modulation operation on a second bit sequence selected from the transport block; and transmitting, to the second communication node, the second modulation symbol on a second data channel.

The generating of the first modulation system may comprise comparing the calculated effective code rate with a preconfigured first configuration code rate; when the calculated effective code rate is greater than the first configuration code rate, identifying a first modulation order applied to the modulation operation on the first bit sequence; defining a second modulation order having a value greater than the first modulation order; selecting a first modified bit sequence based on the second modulation order; and generating the first modulation symbol by performing a modulation operation on the first modified bit sequence based on the second modulation order.

The defining of the second modulation order may comprise recalculating the effective code rate based on modulation orders greater than the first modulation order among modulation orders supported by the communication system; and defining a smallest modulation order among the modulation orders at which the recalculated effective code rate is smaller than the first configuration code rate as the second modulation order.

The generating of the first modulation symbol may comprise defining a modulation symbol generated according to the modulation operation on the first bit sequence as the first modulation symbol when the calculated effective code rate is less than or equal to the first configuration code rate.

The generating of the second modulation symbol may be performed based on the second modulation order when the calculated effective code rate is greater than the first configuration code rate, and performed based on the first modulation order when the calculated effective code rate is equal to or less than the first configuration code rate.

According to the above-described exemplary embodiment of the present disclosure, when bits are repeatedly transmitted twice or more times based on the same RV, the respective bits may be mapped to be transmitted through bit channels having different reliability levels as much as possible for the respective transmissions.

According to the above-described exemplary embodiment of the present disclosure, data can be transmitted and received with high reliability even when a certain data channel existing within a repetitive transmission period is split or the number of OFDM symbols occupied by the data channel is smaller than a configured or preconfigured value.

According to the above-described exemplary embodiment of the present disclosure, when repetitive data transmission from a transmitting node to a receiving node is not smooth, the transmitting node can perform data transmission more easily by variably applying a modulation order.

BRIEF DESCRIPTION OF DRAWINGS

FIG. 4 is a conceptual diagram illustrating a comparison between a normal transmission scheme and a repetitive transmission scheme applied in a communication system.

FIG. 5 is a conceptual diagram illustrating an exemplary embodiment of a rate matching operation.

DETAILED DESCRIPTION OF THE EMBODIMENTS

Figure 1:
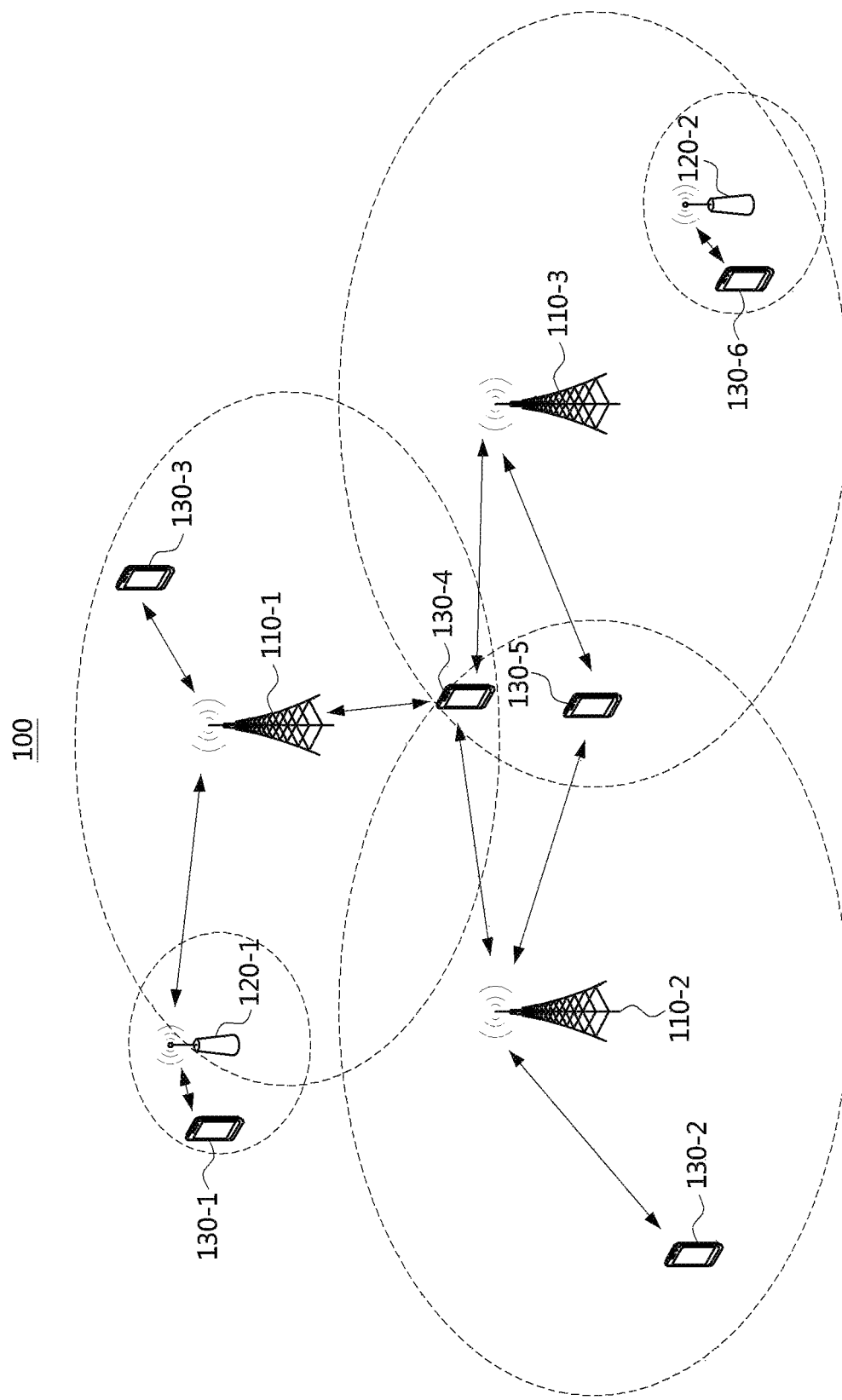
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating an exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)).

The plurality of communication nodes may support 4G communication protocol (e.g., long term evolution (LTE), LTE-advanced (LTE-A)), 5G communication (e.g., new radio (NR)), etc. defined by the 3rd generation partnership project (3GPP) specifications. The 4G communication may be performed in a frequency band of 6 GHz or below, and the 5G communication may be performed in a frequency band of 6 GHz or above as well as the frequency band of 6 GHz or below. For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
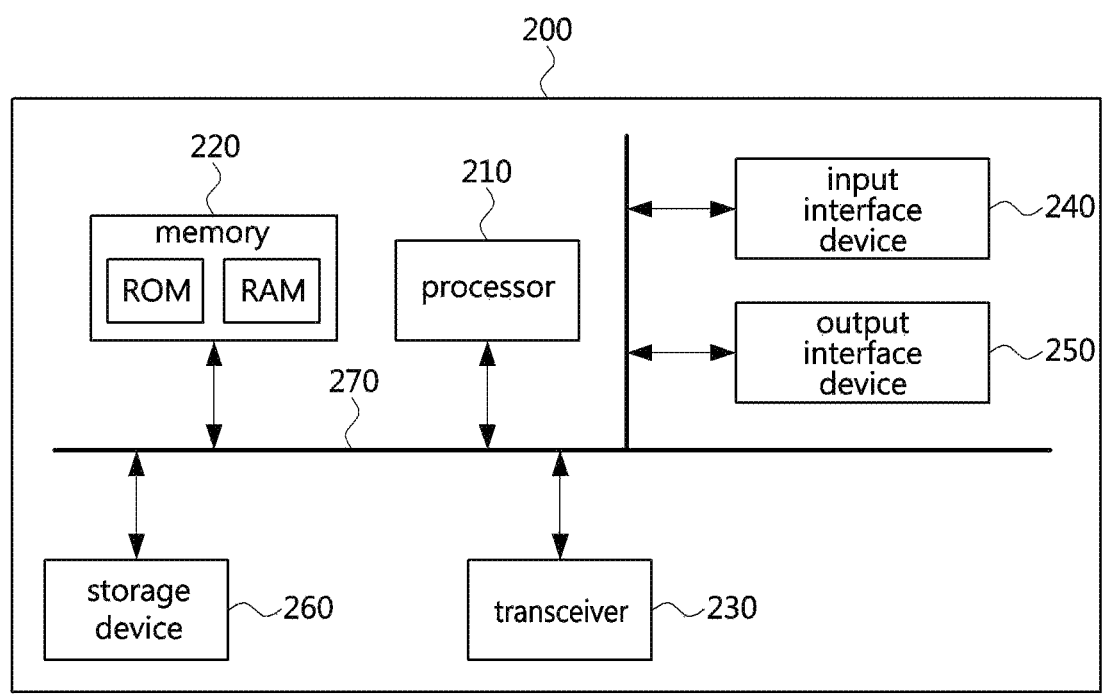
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-gNB, a base transceiver station (BTS), a radio base station, a radio transceiver, an access point, an access node, a road side unit (RSU), a radio remote head (RRH), a transmission point (TP), a transmission and reception point (TRP), a flexible (f)-TRP, or the like. Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal), an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station can perform all functions of a communication protocol (e.g., remote radio transmission/reception function, baseband processing function, etc.). Alternatively, the remote wireless transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of the backhaul link and the fronthaul link may be as follows. When a functional split technique of the communication protocol is applied, the TRP may selectively perform some functions of the BBU or some functions of the MAC/RLC.

Figure 3:
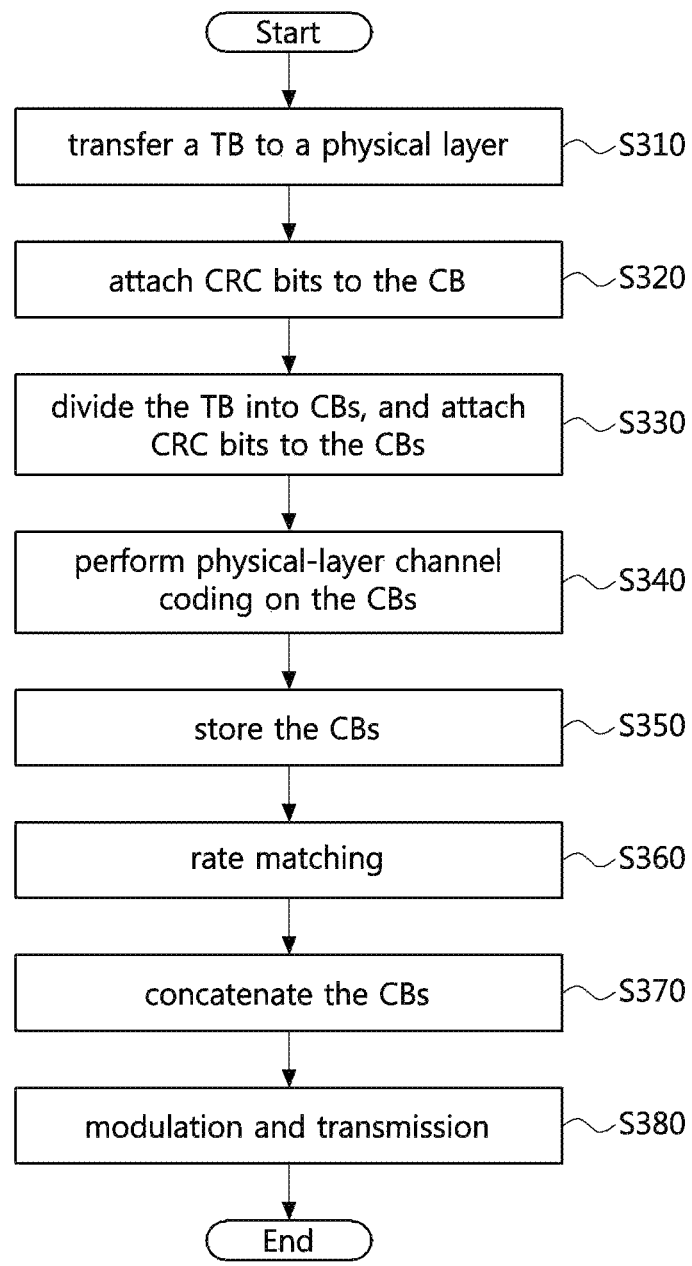
FIG. 3 is a flowchart illustrating an exemplary embodiment of a method for a transmitting node to process a transport block (TB) in a communication system.

FIG. 3 is a flowchart illustrating an exemplary embodiment of a method for a transmitting node to process a transport block (TB) in a communication system.

Referring to FIG. 3, a transmitting node of a communication system may transmit data to be transmitted to a receiving node through a physical channel in form of a TB. The data to be transmitted by the transmitting node may be transferred from a higher layer (e.g., MAC layer) to a physical layer in form of a TB (S310). An error detection/correction code may be added or attached to the TB (S320). For example, cyclical redundancy check (CRC) bits may be added or attached to the TB. The TB may be divided into code blocks (CBs) which are smaller units (S330). An error detection/correction code may be added or attached to each of the CBs. For example, CRC bits may be added or attached to each of the CBs. The error detection/correction code added or attached to the TBs or CBs may be used for error detection and correction operations at the receiving node. Each of the CBs may independently undergo physical layer channel coding (S340). For example, in the 3G and 4G LTE communication systems, each of the CBs may be coded in a turbo code scheme.

Meanwhile, in the 5G NR communication system, the CBs may be coded using a low density parity check (LDPC) code scheme. The coded CBs generated through the channel coding may have a longer length than before encoding. The coded CBs may be stored in a buffer (S350). For example, the coded CBs may be stored in a circular buffer in form of a bit sequence. The coded CBs stored in form of a bit sequence in the buffer may undergo a rate matching process (S360). Here, rate matching may mean a process of storing codeword bits generated through the channel coding in the buffer and fetching as many bits as necessary for transmission. In an exemplary embodiment, the rate matching may be expressed as a circular buffer rate matching (CBRM). The bits selected through the rate matching process may be concatenated (S370). The concatenated bits may be modulated through a modulation process, and may be transmitted through a physical channel (S380).

FIG. 4 is a conceptual diagram illustrating a comparison between a normal transmission scheme and a repetitive transmission scheme applied in a communication system.

Referring to FIG. 4, a transmitting node of a communication system may transmit data to be transmitted to a receiving node in form of a TB. When the transmitting node transmits the TB according to a normal transmission scheme, a control channel and a data channel may be alternately transmitted by a physical layer each time. For example, when the transmitting node transmits a downlink (DL) TB according to the normal transmission scheme, a physical downlink control channel (PDCCH) and a physical downlink shared channel (PDSCH) may be alternately transmitted each time. That is, transport blocks TB_a, TB_b, TB_c, and TB_d may be transmitted through PDSCHs, respectively, and control information for transmission of a PDSCH may be transmitted through a PDCCH before each PDSCH is transmitted. When the transmitting node transmits an uplink TB according to the normal transmission scheme, a PDCCH and a physical uplink shared channel (PUSCH) may be alternately transmitted each time. In this case, the control channel PDCCH may include control information for a PDSCH(s) or a PUSCH(s) other than the adjacent PDSCH or PUSCH.

Meanwhile, as one of techniques for improving reliability of data transmission in the communication system, a repetitive transmission technique may be applied. The repetitive transmission may mean repeatedly transmitting the same TB through one or more PDSCHs or PUSCHs. When a transmitting node transmits the TB according to the repetitive transmission scheme, the same data channel may be transmitted several times through one control channel transmission. For example, when the transmitting node transmits a DL TB according to the repetitive transmission scheme, a plurality of PDSCHs containing the same TB may be repeatedly transmitted after one PDCCH transmission. When the transmitting node transmits a UL TB according to the repetitive transmission scheme, a plurality of PUSCHs containing the same TB may be repeatedly transmitted after one PUCCH transmission.

In an exemplary embodiment of the 5G NR system, a base station may configure repetitive transmission for a terminal semi-statically based on a parameter pdsch-AggregationFactor or pusch-AggregationFactor, which is included in a radio resource control (RRC) message. In another exemplary embodiment of the 5G NR system, a base station supporting a service such as Ultra-Reliable Low-Latency Communication (URLLC) may dynamically indicate repetitive transmission to a terminal based on downlink control information (DCI), etc. A receiving node receiving data through the repetitive transmissions may attempt to restore the transmitted TB by using signals received up to a specific time point. The receiving node receiving the repetitive transmissions may attempt to restore the TB even in each individual reception step before all receptions of the repetitive transmissions are completed.

FIG. 5 is a conceptual diagram illustrating an exemplary embodiment of a rate matching operation. Hereinafter, the rate matching operation will be described in more detail with reference to FIGS. 3 to 5.

The bit selection in the rate matching operation of the step S360 may be performed based on a redundancy version (RV) value and a modulation coding scheme (MCS). For example, in the rate matching operation, as many bits as the number of bits used for transmission calculated from the MCS may be selected. For example, when data transmitted from the transmitting node to the receiving node is modulated in a QAM scheme, as many bits as necessary may be selected and modulated according to the number of QAM symbols among bits stored in the buffer. Meanwhile, the RV value may be used to determine which part of the bit sequence stored in the buffer is selected.

In an exemplary embodiment of the 4G LTE or 5G NR communication system, 2 bits may be used to indicate the RV. The RV value may be expressed as 4 values such as 0, 1, 2, and 3. Each of the RV values may indicate a different position in the bit sequence stored in the buffer. The base station or the transmitting node may control different bits in the bit sequence within the buffer to be transmitted through the use of various RV values. In an exemplary embodiment of the 5G NR communication system, when a configured grant (CG)-based semi-static scheduling is used, the base station may configure RVs to be used for PUSCHs transmitted more than once during a repetitive transmission period according to a predetermined RV pattern. For example, the RV pattern may be selected as one of '0231', '0303', and '0000'. When the number of repetitive transmissions is greater than 4, the RV pattern may be repeatedly applied. The RV pattern may be applied in order from a position other than the beginning. The above operations may mean that the RV pattern having a length of 4 is used cyclically. The cyclic use of the RV pattern may be referred to as 'RV cycling'.

When the transmitting node wants to transmit the same data to a plurality of terminals, a unicast transmission scheme in which data is transmitted by allocating a separate resource to each terminal may be inefficient. Instead, a Point-to-MultiPoint (P2MP) transmission scheme, a multicast scheme, a broadcast transmission scheme, or the like in which the same data is simultaneously delivered to a plurality of terminals using the same resource may be more efficient.

For example, in the 3G communication system, such the P2MP transmission scheme may be implemented with a Multimedia Broadcast Multicast Services (MBMS) technology. Meanwhile, in the 4G LTE communication system, such the P2MP transmission scheme may be implemented with an evolved MBMS (eMBMS)/further evolved MBMS (FeMBMS) technology. The MBMS may be largely classified into a Multicast Broadcast Single Frequency Network (MBSFN) scheme and a Single Cell Point To Multipoint (SC-PTM) scheme. In the case of such the P2MP transmission, reliability of a communication link may be determined based on terminals having a poor channel environment among terminals which simultaneously perform receptions. In particular, when the channel environment between the transmitting node and the receiving node is poor, a method for improving the reliability of the communication link may be required. The 5G NR system may support URLLC services that require low latency and high reliability. In this case, a method for improving high reliability may be required. To this end, a repetitive transmission scheme in which the same TB is transmitted more than once from the transmitting node to the receiving node may be applied.

The present disclosure proposes exemplary embodiments for a resource-efficient transmission scheme for UL and DL transmissions based on a repetitive transmission scheme. More specifically, the present disclosure proposes exemplary embodiments of a physical layer transmission method for repeatedly transmitting the same TB through one or more PDSCHs or PUSCHs. An exemplary embodiment of the present disclosure may include a method of determining a transport block size (TBS) meaning the size of each TB in order to improve performance during the repetitive transmissions. Alternatively, exemplary embodiments of the present disclosure may include a method of configuring a modulation order, a code rate, and the like as well as the MCS to be used for transmission.

Figure 6A:
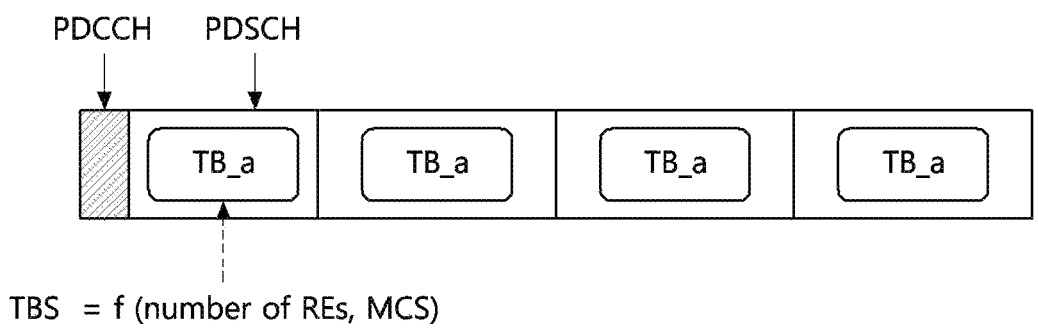
FIG. 6A is a conceptual diagram illustrating a repetitive transmission method according to an exemplary embodiment of a communication system.
Figure 6B:
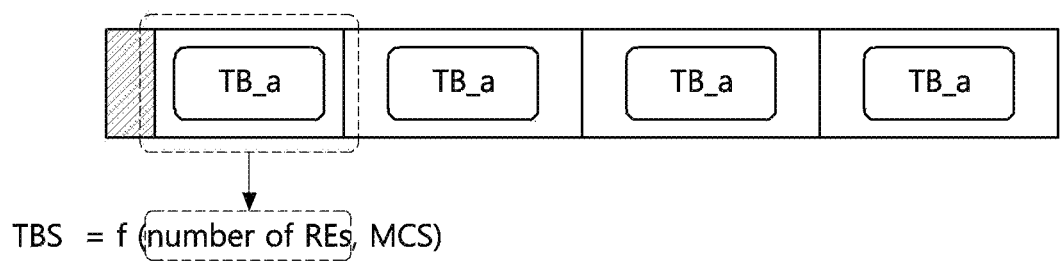
FIG. 6B is a conceptual diagram illustrating a first exemplary embodiment of a TBS calculation method in a communication system.
Figure 6C:
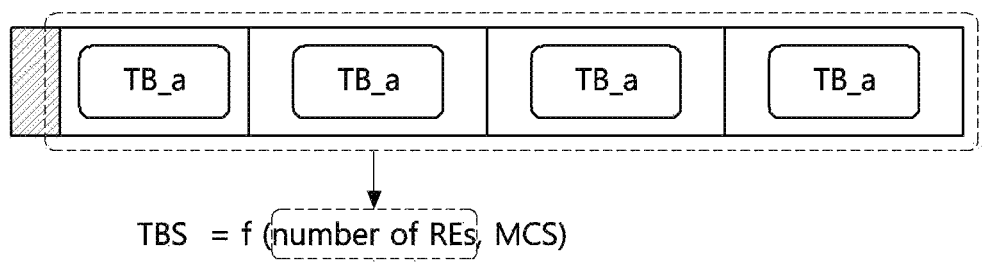
FIG. 6C is a conceptual diagram illustrating a second exemplary embodiment of a TBS calculation method in a communication system.

FIG. 6A is a conceptual diagram illustrating a repetitive transmission method according to an exemplary embodiment of a communication system, FIG. 6B is a conceptual diagram illustrating a first exemplary embodiment of a TBS calculation method in a communication system, and FIG. 6C is a conceptual diagram illustrating a second exemplary embodiment of a TBS calculation method in a communication system.

Referring to FIG. 6A, when a transmitting node transmits a TB according to a repetitive transmission scheme, the same data channel may be transmitted several times after one control channel transmission. For example, when the transmitting node transmits a DL TB according to the repetitive transmission scheme, a plurality of PDSCHs containing the same TB may be repeatedly transmitted after one PDCCH transmission. When the transmitting node transmits a UL TB according to the repetitive transmission scheme, a plurality of PUSCHs containing the same TB may be repeatedly transmitted after one PDCCH transmission.

The size of the TB transmitted through the data channel may be expressed as a TBS. In an exemplary embodiment of the 5G NR communication system, the TBS may be calculated or determined based on the number of resource elements (REs) occupied by the data channel, a used MCS index, and the like. In addition, the TBS may be calculated further based on the number of layers used for transmission. Alternatively, the TBS may be calculated according to a scheme defined in a technical specification.

The number of REs used in the TBS calculation process may be calculated based on the number of resource blocks (RBs) allocated to the data channel, the number of OFDM symbols, the number of REs occupied by a demodulation reference signal (DMRS), an overhead configured by an RRC parameter xOverhead, and the like.

In the 5G NR communication system, one or more MCS index tables may be supported. Table 1 shows an exemplary embodiment of an MCS index table that can be supported in the 5G NR communication system.

TABLE 1

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

Referring to Table 1, in an exemplary embodiment of the MCS index table, each MCS index may correspond to a modulation order, a target code rate, and a spectral efficiency.

Here, the base station may set an MCS index table to be used by the terminal within the cell to calculate the TBS. That is, TBS calculation processes and results of the base station and the terminal may be the same.

In describing a specific configuration of the repetitive transmission method based on the present disclosure, for convenience, a PUSCH and a PDSCH may be collectively referred to as a 'data channel'. All exemplary embodiments of the present disclosure, which are applied to a data channel, may be implemented as modified to be applied to a PUSCH or a PDSCH. That is, all exemplary embodiments described as applied to a PUSCH may be modified and implemented as applied to a PDSCH. On the other hand, all exemplary embodiments described as applied to a PDSCH may be modified and implemented as applied to a PUSCH.

Referring to FIG. 6B, in a first exemplary embodiment of the TBS calculation method in the communication system, the number of REs occupied by a certain data channel among one or more data channels through which the same TB is transmitted may be used for TBS calculation. For example, the TBS may be calculated based on the number of REs of a first PDSCH among a plurality of PDSCHs through which the same TB is transmitted. Here, the data channel on which the TBS calculation is based may be the first data channel among one or more data channels transmitted in the repetitive transmission process. Alternatively, the data channel on which the TBS calculation is based may be a data channel having the smallest number of OFDM symbols among one or more data channels transmitted in the repetitive transmission process. Alternatively, the data channel on which the TBS calculation is based may be a data channel having the largest number of OFDM symbols among one or more data channels transmitted in the repetitive transmission process. In addition, the data channel on which the TBS calculation is based may be selected based on various other criteria.

Referring to FIG. 6C, in a second exemplary embodiment of the TBS calculation method in the communication system, the number of REs occupied by all data channels used for the repetitive transmissions of the same TB may be used for TBS calculation. For example, the TBS may be calculated based on the number of all REs constituting a plurality of PDSCHs through which the same TB is transmitted.

The above-described first and second exemplary embodiments of the TBS calculation method may be compared in terms of an effective code rate. Here, the effective code rate may mean a code rate calculated based only on REs used for the repetitive transmissions, which is different from a target code rate defined through the MCS index table. The effective code rate $R_E$ may be calculated as in Equation 1.

$$R_E = \frac{(TBS + \text{number of } TB \; CRC \text{ bits})}{\left(\begin{array}{c}\text{Total number of } REs \text{ occupied by the corresponding}\\ \text{data channels} * QAM \text{ modulation order}\end{array}\right)} \quad \text{[Equation 1]}$$

That is, the effective code rate may be calculated based on the size of the TB (i.e., TBS), the number of CRC bits added or attached to the TB, the total number of REs occupied by the corresponding data channels, and the modulation order. For example, in an exemplary embodiment of the present disclosure, the QAM may include a binary phase shift keying (BPSK) modulation scheme. The modulation order of the BPSK modulation scheme may be 1. In this case, the effective code rate may be defined as a value obtained by dividing a value obtained by summing the size of the TB and the number of CRC bits added or attached to the TB by the total number of REs occupied by the corresponding data channels (PUSCHs or PDSCHs). However, this is only an example for convenience of description, and exemplary embodiments of the present disclosure are not limited thereto.

Hereinafter, first to fifth exemplary embodiments of the repetitive transmission method according to the present disclosure for improving repetitive transmission performance of the communication system will be described. Specifically, the first and second exemplary embodiments of the present disclosure are exemplary embodiments based on the above-described first exemplary embodiment of the TBS calculation method. The third exemplary embodiment of the present disclosure is an exemplary embodiment based on the above-described second exemplary embodiment of the TBS calculation method. The fourth and fifth exemplary embodiments of the present disclosure are exemplary embodiments based on the above-described first and second exemplary embodiments of the TBS calculation method.

Exemplary Embodiment #1 of Repetitive Transmission Method

In the first exemplary embodiment of the repetitive transmission method according to the present disclosure, a bit-to-symbol mapping scheme capable of improving reception efficiency at a receiving end in repetitive transmission is proposed. In case that a specific bit stored in the buffer is transmitted more than once during a repetitive transmission process, a transmitting node of the communication system may perform bits-to-symbol mapping so that the specific bit is transmitted through a bit channel having a different reliability for each transmission. The first exemplary embodiment of the repetitive transmission method according to the present disclosure may be applied when an n-QAM modulation scheme having a modulation order of 4 or higher is used for modulation of transmission data. For example, the first exemplary embodiment of the repetitive transmission method according to the present disclosure may be applied when a modulation scheme such as 16-QAM, 64-QAM, 256-QAM, or 512-QAM is used.

Hereinafter, for convenience of description, a case in which the 16-QAM modulation scheme corresponding to a modulation order 4 is used will be described as an example. However, exemplary embodiments of the present disclosure are not limited thereto, and may be applied when all QAM modulation schemes of 16-QAM or higher are used.

The data to be transmitted by the transmitting node of the communication system may be transferred from a higher layer to a physical layer in form of a TB. The TB may be divided into CBs which are smaller units. Each of the divided CBs may independently undergo physical layer channel coding. The coded CBs may be stored in form of a bit sequence in a circular buffer. The bit sequences stored in the buffer may be grouped by 4 bits and mapped to one 16-QAM symbol.

Figure 7:
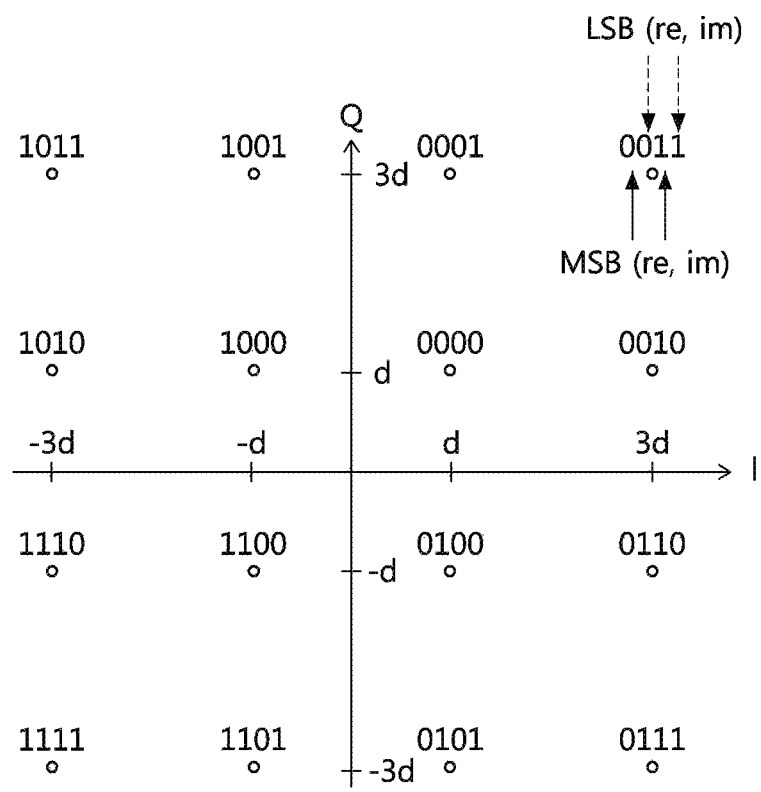
FIG. 7 is a conceptual diagram illustrating a first exemplary embodiment of a repetitive transmission method according to the present disclosure.

FIG. 7 is a conceptual diagram illustrating a first exemplary embodiment of a repetitive transmission method according to the present disclosure.

FIG. 7 shows a signal constellation configuration of a 16-QAM symbol used in the 4G LTE or 5G NR communication system. Here, among four bits constituting the 16-QAM signal constellation, two bits may correspond to most significant bits (MSBs), and the remaining two bits may correspond to least significant bits (LSBs). This may mean that the four bits constituting the signal constellation are separated into two types of virtual bit channels having different reliability.

In this case, when bits are repeatedly transmitted two or more times as 16-QAM symbols, the transmitting node according to the first exemplary embodiment of the present disclosure may map the bits mapped to the MSBs in the first transmission to the LSBs in the second transmission, and map the bits mapped to the LSBs in the first transmission to the MSBs in the second transmission. Through this, in the process in which the bits are transmitted twice as 16-QAM symbols, all bits may be transmitted as mapped to the MSBs and LSBs once, respectively. This may have higher reception performance compared to a case in which bits are mapped to either MSBs or LSBs in the first and second transmissions when the bits are transmitted twice as 16-QAM symbols.

As described above, in the first exemplary embodiment of the repetitive transmission method according to the present disclosure, in the cast that a specific bit stored in the buffer is transmitted more than once during the repetitive transmission process, the transmitting node of the communication system may perform bits-to-symbol mapping so that the specific bit is transmitted through a bit channel having a different reliability for each transmission. This may be applied not only to the 16-QAM modulation scheme, but also to a higher QAM modulation scheme. For example, in a QAM signal constellation used in the 5G NR system, in case of a 64-QAM modulation scheme having a modulation order of 6, there may be three virtual bit channels having different reliability levels. Here, when the same bit is repeatedly transmitted a plurality of times, the transmitting node may perform bits-to-symbol mapping so that it is transmitted through a bit channel having different reliability for each transmission.

In particular, when the same bits are repeatedly transmitted three or more times in the 64-QAM modulation scheme, all bits may be transmitted as mapped to the MSBs location once. Through this, the communication system can obtain a reception performance gain. Meanwhile, in the case of a 256-QAM modulation scheme having a modulation order of 8, there may be four virtual bit channels having different reliability levels. Here, when the same bit is repeatedly transmitted a plurality of times, the transmitting node may perform bit-to-symbol mapping so that it is transmitted through a bit channel having different reliability for each transmission. In particular, when the same bits are repeatedly transmitted four or more times in the 256-QAM modulation scheme, all bits may be transmitted as mapped to the MSBs once. Through this, the communication system can obtain a reception performance gain.

Hereinafter, a specific configuration of an operation in which the transmitting node performs bit-to-symbol mapping in the first exemplary embodiment of the repetitive transmission method according to the present disclosure will be described as an example.

In the case that the same bit is repeatedly transmitted a plurality of times, the transmitting node may perform bits-to-symbol mapping so that it is transmitted through a bit channel having different reliability for each transmission. Specifically, an offset may be introduced into an equation for mapping a bit sequence to a QAM symbol. Through this, when the same RV is used more than once during the repetitive transmission process, each bit may be mapped to a bit position having different reliability for each transmission. For example, an offset $O_{B2S}$ introduced in an equation for mapping bits to QAM symbols may be expressed as Equation 2.

[Equation 2]

$$O_{B2S} = f(n, m) = f\begin{pmatrix} \text{total number of times that specific } RV \text{ has been used} \\ \text{up to a corresponding time point in repetive transmissions,} \\ \text{modulation order} \end{pmatrix}$$

Referring to Equation 2, the offset $O_{B2S}$ introduced in the equation for mapping bits to QAM symbols may be defined as a function of the total number of times n that a specific RV has been used up to a corresponding time point in repetitive transmission and the modulation order m. Accordingly, when the same RV is used more than once in the repetitive transmission process, a different offset value may be applied for each transmission. When a different offset value is applied for each transmission, each bit may be mapped to be transmitted through a bit channel having different reliability as much as possible for each transmission. Through this, the communication system can obtain a reception performance gain.

In the first exemplary embodiment of the repetitive transmission method according to the present disclosure, the transmitting node may select a first bit sequence from the transport block. The transmitting node may generate a first modulation symbol by performing a modulation operation on the selected first bit sequence. The transmitting node may generate an n-th bit sequence by changing an arrangement order of bits included in the first bit sequence according to a preconfigured rule. n may be 2. Alternatively, n may be a natural number greater than 2. For example, n may mean the number of bit sequences generated from the first bit sequence up to the corresponding time point.

Here, the preconfigured rule may mean a rule of changing the arrangement order of the bits so that each bit included in the n-th bit sequence has a reliability different from reliability thereof in the first bit sequence. Alternatively, the preconfigured rule may be based on the offset $O_{B2S}$ expressed as in Equation 2, for example.

Alternatively, according to the preconfigured rule, each of the first bit sequence and the n-th bit sequence may include m bits, and the m bits in the first bit sequence may include x MSBs and y LSBs. Here, x may be 2, y may be 2, and m may be a multiple of the modulation order of the modulation operation at the transmitting node. The MSBs in the first bit sequence may be configured as bits other than MSBs in the n-th bit sequence. For example, the MSBs in the first bit sequence may be configured as the LSBs in the nth bit sequence. On the other hand, when m is greater than x+y, the MSBs in the first bit sequence may be configured as bits other than the MSBs or LSBs in the n-th bit sequence. The LSBs in the first bit sequence may be configured as bits other than the LSBs in the n-th bit sequence. For example, the LSBs in the first bit sequence may be configured as the MSBs in the n-th bit sequence. On the other hand, when m is greater than x+y, the LSBs in the first bit sequence may be configured as bits other than the MSBs or LSBs in the n-th bit sequence.

Exemplary Embodiment #2 of Repetitive Transmission Method

In the second exemplary embodiment of the repetitive transmission method according to the present disclosure, an operation of allocating RV values to data channels used in the repetitive transmission process is proposed. The second exemplary embodiment of the repetitive transmission method according to the present disclosure may be applied even when one or more data channels (PDSCHs, PUSCHs, etc.) are split by a slot boundary or the like within the repetitive transmissions. In general, each data channel may occupy as many OFDM symbols as indicated through a start and length indicator value (SLIV). Meanwhile, when one data channel cannot occupy as many OFDM symbols as indicated by an SLIV value due to a slot boundary or the like, the corresponding data channel may be split into two data channels. That is, the split of the data channel may mean that one data channel is divided into two data channels occupying a smaller number of OFDM symbols than the number indicated through the SLIV value.

In the communication system to which the repetitive transmission scheme is applied, RV values of data channels that are repeatedly transmitted may be determined based on a configured or preconfigured RV pattern. Here, an RV value in the RV pattern may be allocated according to an order in which a data channel is transmitted within the repetitive transmissions. For example, when a plurality of PUSCHs are transmitted according to the repetitive transmission scheme, RV values in the RV pattern may be sequentially allocated from a PUSCH transmitted first. In an exemplary embodiment of the communication system, RV values in the RV pattern may be allocated according to an order of the numbers of symbols occupied by data channels existing within the repetitive transmission period. For example, when a plurality of PUSCHs are transmitted according to the repetitive transmission scheme, RV values in the RV pattern may be sequentially allocated from a PUSCH having a large number of occupied OFDM symbols.

Hereinafter, the second exemplary embodiment of the repetitive transmission method according to the present disclosure will be described with reference to FIG. 5 again. In an exemplary embodiment of the communication system, the size of the RV pattern may be 4, and the RV value may be basically set to one of 0, 1, 2, and 3. Each of the RV values such as 0, 1, 2, 3, etc. may indicate a specific position in the corresponding buffer according to the size of the buffer. When the number of repetitive transmissions to which the repetitive transmission scheme is applied is greater than the length of the RV pattern, the RV pattern may be cyclically applied. Such cyclic use of the RV pattern may be referred to as 'RV cycling'. Based on the RV cycling, each RV may be allocated an arbitrary number of times to a plurality of data channels repeatedly transmitted. Rate matching may be performed based on the RVs allocated to the respective data channels. The bits selected through the rate matching may be transmitted through a corresponding data channel as concatenated and modulated.

Here, if a data channel is split into two parts or the number of OFDM symbols occupied by the data channel is less than a preconfigured value, some of the bits selected for transmission through the data channel may not be transmitted. In the second exemplary embodiment of the repetitive transmission method according to the present disclosure, a method to compensate for this problem is proposed. More specifically, proposed is a method of allocating a new RV value when an arbitrary data channel existing in the repetitive transmission period is split or the number of OFDM symbols occupied by the data channel is smaller than a preconfigured value. Here, the newly allocated RV value is expressed as RV x for convenience.

The RV x may be allocated to a data channel in the repetitive transmission period. The RV x allocated to the data channel may indicate a bit position immediately following the last bit of a bit sequence included in a data channel transmitted immediately before the corresponding data channel. The position indicated by each of the existing RV values such as 0, 1, 2, 3, etc. in the buffer may be absolutely determined by the length of the CB, etc. On the other hand, the position indicated by the RV x in the buffer may be relatively determined by bits included in the data channel immediately before the data channel to which the RV x is allocated. As a result, when a data channel is split into two parts or the number of OFDM symbols occupied by a data channel is smaller than a preconfigured value, a missing problem caused by a decrease in the number of bits transmitted through the data channel can be solved.

Specifically, the second exemplary embodiment of the repetitive transmission method according to the present disclosure may include an operation for allocating an RV x. When a certain data channel existing in the repetitive transmission period is split or it is confirmed that the number of OFDM symbols occupied by the data channel is smaller than a configured or preconfigured value, an RV x may be allocated to the next data channel. Alternatively, when the data channel split operation is identified within the repetitive transmission period, an RV x may be allocated to a data channel transmitted later among the split data channels. The above RV x allocation may be explicitly performed by the transmitting node for the receiving node. Alternatively, the RX x allocation may be performed by implicit determination of the receiving node.

Alternatively, when it is identified that a relative ratio of a length of a bit sequence included in a data channel to the size of the buffer is smaller than a configured or preconfigured value, an RV x may be allocated to a data channel transmitted after the corresponding data channel. Here, the above-described RV x allocation operation may be repeatedly performed again in such a manner that an RV x is allocated to a next data channel when it is confirmed that a relative ratio of a length of all bit sequences included in an arbitrary data channel and the data channel to which the RV x is allocated to the size of the buffer is less than a configured or preconfigured value.

A start position $k_0'$ indicated by the RV x in the buffer may be defined as in Equation 3.

$$k_0' = (k_0 + k) \bmod C \qquad \text{[Equation 3]}$$

Here, $k_0$ may mean a start position in the buffer, which is indicated by the RV value allocated to the data channel immediately before the data channel to which the RV x is allocated. k may mean the number of bits in the buffer, which are transmitted through the data channel immediately before the data channel to which the RV x is allocated. C may mean the size of the buffer.

In the above-described second exemplary embodiment of the repetitive transmission method according to the present disclosure, as an example for convenience of description, described was the operation of allocating an RV x to a next data channel when it is confirmed that a certain data channel existing within the repetitive transmission period is split or the number of OFDM symbols occupied by the data channel is smaller than a configured or preconfigured value. However, exemplary embodiments of the present disclosure are not limited thereto. For example, in another exemplary embodiment of the repetitive transmission method according to the present disclosure, when it is confirmed that a certain data channel existing within the repetitive transmission period is split or the number of OFDM symbols occupied by the data channel is smaller than a configured or preconfigured value, an RV may not be allocated to the corresponding data channel. Alternatively, in another exemplary embodiment of the repetitive transmission method according to the present disclosure, when it is confirmed that a certain data channel existing within the repetitive transmission period is split or the number of OFDM symbols occupied by the data channel is smaller than a configured or preconfigured value, an RV allocated to the data channel may be reallocated to a next data channel.

According to the second exemplary embodiment of the repetitive transmission method according to the present disclosure, even when a certain data channel existing within the repetition transmission period is split or the number of OFDM symbols occupied by the data channel is smaller than a configured or preconfigured value, the data can be transmitted and received with high reliability.

Exemplary Embodiment #3 of Repetitive Transmission Method

In the third exemplary embodiment of the repetitive transmission method according to the present disclosure, an operation of increasing a modulation order is proposed in order to solve a case when transmission/reception is not smooth in the repetitive transmission process. For example, when a transmitting node repeatedly transmits data to a receiving node, an effective code rate may be calculated based on a modulation order determined based on an MCS index table. In this case, when the calculated effective code rate is high and corresponds to a reference code rate (e.g., 0.95) or higher for skipping decoding at a receiving end, data transmission/reception may not be smooth. Alternatively, when the effective code rate is increased due to a split of a data channel and thus exceeds the reference code rate at which decoding is skipped, data transmission/reception may not be smooth. Alternatively, if some of systematic bits are not transmitted normally, data transmission/reception may not be smooth. The third exemplary embodiment of the repetitive transmission method according to the present disclosure may include an operation of increasing a modulation order to solve the above-described problems.

In the 5G NR communication system, an MCS index table may be used for transmission/reception operations of a transmitting node and a receiving node. As described with reference to Table 1, in an exemplary embodiment of the MCS index table, each MCS index may correspond to one modulation order and one target code rate.

In the third exemplary embodiment of the repetitive transmission method according to the present disclosure, each MCS index may correspond to one or more modulation orders. Through this, when data is transmitted from the transmitting node to the receiving node, the modulation order may be flexibly applied according to a transmission situation. For example, when a terminal wants to transmit data to a base station through a PUSCH, even if the base station designates one MCS index, the terminal may transmit data by selectively applying a modulation order. Each MCS index may correspond to a higher modulation order Qm' in addition to a modulation order Qm described in the MCS index table. Here, Qm' may be selected as a value greater than Qm among modulation orders supported by the 5G NR system. For example, Qm' may be defined as Qm+2, Qm+4, Qm+6, or the like. Specifically, in the third exemplary embodiment of the repetitive transmission method according to the present disclosure, an offset value $O_Q$ of the modulation order corresponding to a difference between Qm and Qm' may be configured. Here, $O_Q$ may be defined as in Equation 4.

$$O_Q = \frac{(Qm' - Qm)}{2} \qquad \text{[Equation 4]}$$

The base station may transfer the configured modulation order offset $O_Q$ to the terminal. Specifically, the base station may transmit the offset $O_Q$ value to the terminal through a radio resource control (RRC) message, a Media Access Control (MAC) control element (CE) message, or downlink control information (DCI).

Alternatively, in the third exemplary embodiment of the repetitive transmission method according to the present disclosure, the transmitting node of the communication system may identify a modulation order Qm and an effective code rate $R_E$ calculated based on the modulation order for each data channel within a repetitive transmission period based on an MCS index. The calculated effective code rate $R_E$ may be compared with a configured or preconfigured reference code rate. Here, the reference code rate may correspond to a reference code rate (e.g., 0.95) for determining a decoding skip in the 5G NR communication system. Alternatively, the reference code rate may be a value previously promised between the base station and the terminal. Alternatively, the reference code rate may be a value configured by the base station to the terminal through an RRC message or the like. When the calculated effective code rate $R_E$ is less than the configured or preconfigured reference code rate, the transmitting node may transmit data through the data channel according to a modulation scheme corresponding to Qm. On the other hand, when the effective code rate $R_E$ is higher than the reference code rate, the transmitting node may identify a minimum modulation order at which an effective code rate corresponding to an increased modulation order is less than the reference code rate by increasing the modulation order by 2. The transmitting node may perform transmission operations based on the identified modulation order.

Specifically, the transmitting node of the communication system may select a first bit sequence from the TB. The selection operation for the first bit sequence may be performed based on the first modulation order Qm. The transmitting node may modulate the selected first bit sequence based on the first modulation order Qm. The transmitting node may calculate the effective code rate $R_E$ based on the modulation operation for the first bit sequence. he transmitting node may compare the calculated effective code rate $R_E$ with a preconfigured first configuration code rate. Here, the first configuration code rate may correspond to the reference code rate (e.g., 0.95) for determining a decoding skip in the 5G NR communication system.

When the effective code rate $R_E$ is less than or equal to the first configuration code rate, the transmitting node may transmit the modulation symbol generated according to the modulation operation on the first bit sequence to the receiving node. The transmitting node may perform subsequent repetitive transmission operations based on the first modulation order Qm.

Meanwhile, when the effective code rate $R_E$ is less than or equal to the first configuration code rate, the transmitting node may define the second modulation order Qm'. The second modulation order Qm' may be defined as a value greater than the first modulation order Qm among modulation orders supported by the communication system. Specifically, the transmitting node may recalculate the effective code rate based on modulation orders greater than the first modulation order Qm. The transmitting node may define the smallest value among the modulation orders at which the recalculated effective code rate is smaller than the first configuration code rate as the second modulation order Qm'. The transmitting node may select the first modified bit sequence based on the newly defined second modulation order Qm'. The transmitting node may modulate the selected first modified bit sequence based on the second modulation order Qm' and transmits it to the receiving node. The transmitting node may perform subsequent repetitive transmission operations based on the second modulation order Qm'.

Alternatively, in the third exemplary embodiment of the repetitive transmission method according to the present disclosure, a plurality of MCS indices may be used for repetitive transmission of the transmitting node. For example, when the terminal repeatedly transmits data to the base station through PUSCH, the base station may transfer a separate MCS index to the terminal in addition to an MCS index indicated to the terminal for TBS calculation. The separately transferred MCS index may indicate a modulation order to be used in the corresponding PUSCH. The separately transferred MCS index may be selected as one of MCS indexes marked as 'reserved' in the MCS index table defined in the technical specification.

According to the third exemplary embodiment of the repetitive transmission method according to the present disclosure, when repetitive data transmission from the transmitting node to the receiving node is not smooth, the transmitting node may variably apply a modulation order or an MCS index to perform data transmission more easily.

Exemplary Embodiment #4 of Repetitive Transmission Method

In a fourth exemplary embodiment of the repetitive transmission method according to the present disclosure, an operation of selectively applying the first and second exemplary embodiments of the TBS calculation method in the communication system described with reference to FIGS. 6B and 6C is proposed. In the first exemplary embodiment of the TBS calculation method, the number of REs occupied by one data channel among one or more data channels through which the same TB is transmitted may be used for TBS calculation. Meanwhile, in the second exemplary embodiment of the TBS calculation method in the communication system, the number of REs occupied by all data channels used for repetitive transmissions of the same TB may be used for TBS calculation. In the fourth exemplary embodiment of the repetitive transmission method according to the present disclosure, proposed are configurations for increasing the efficiency of the communication system by selectively applying one of the first and second exemplary embodiments of the above-described TBS calculation method according to a communication situation.

In the fourth exemplary embodiment of the repetitive transmission method according to the present disclosure, the base station may select one of the first and second exemplary embodiments of the TBS calculation method and transmit information on the selected method to the terminal. Here, when the terminal transmits PUSCHs through semi-static scheduling such as a configured grant, the base station may configure the information on the selected TBS calculation method to the terminal through an RRC message. On the other hand, when the terminal transmits PUSCHs by dynamic scheduling using a DCI or the like, the base station may transmit the information on the selected TBS calculation method to the terminal by including the information in a DCI message.

In the fourth exemplary embodiment of the repetitive transmission method according to the present disclosure, the above-described first and second exemplary embodiments of the TBS calculation method may be selectively used. One of the first and second exemplary embodiments of the TBS calculation method may be selected and used according to an MCS index value indicated by the base station to the terminal. Here, the selection of the TBS calculation method may be performed further based on a reference MCS index or a reference target code rate configured or preconfigured from the base station to the terminal. The selection of the TBS calculation method may be performed according to a previously promised scheme such as, for example, schemes 1 to 4.

Scheme 1: When the MCS index indicated to the terminal is less than the reference MCS index, the first exemplary embodiment of the TBS calculation method may be selected and used. On the other hand, when the MCS index indicated to the terminal is greater than or equal to the reference MCS index, the second exemplary embodiment of the TBS calculation method may be selected and used.

Scheme 2: When the MCS index indicated to the terminal is less than the reference MCS index, the second exemplary embodiment of the TBS calculation method may be selected and used. On the other hand, when the MCS index indicated to the terminal is greater than or equal to the reference MCS index, the first exemplary embodiment of the TBS calculation method may be selected and used.

Scheme 3: When the target code rate corresponding to the MCS index indicated to the terminal is less than the reference target code rate, the second exemplary embodiment of the TBS calculation method may be selected and used. On the other hand, when the target code rate corresponding to the MCS index indicated to the terminal is greater than or equal to the reference target code rate, the first exemplary embodiment of the TBS calculation method may be selected and used.

Scheme 4: When the target code rate corresponding to the MCS index indicated to the terminal is less than the reference target code rate, the first exemplary embodiment of the TBS calculation method may be selected and used. On the other hand, when the target code rate corresponding to the MCS index indicated to the terminal is greater than or equal to the reference target code rate, the second exemplary embodiment of the TBS calculation method may be selected and used.

In the above-described fourth exemplary embodiment of the repetitive transmission method according to the present disclosure, one of the first and second exemplary embodiments of the TBS calculation method may be selectively applied according to values indicated and configured by the base station to the terminal. Through this, an advantageous TBS calculation method may be selectively applied according to a communication situation. Therefore, the reliability and efficiency of the communication system can be improved.

Exemplary Embodiment #5 of Repetitive Transmission Method

Figure 8:
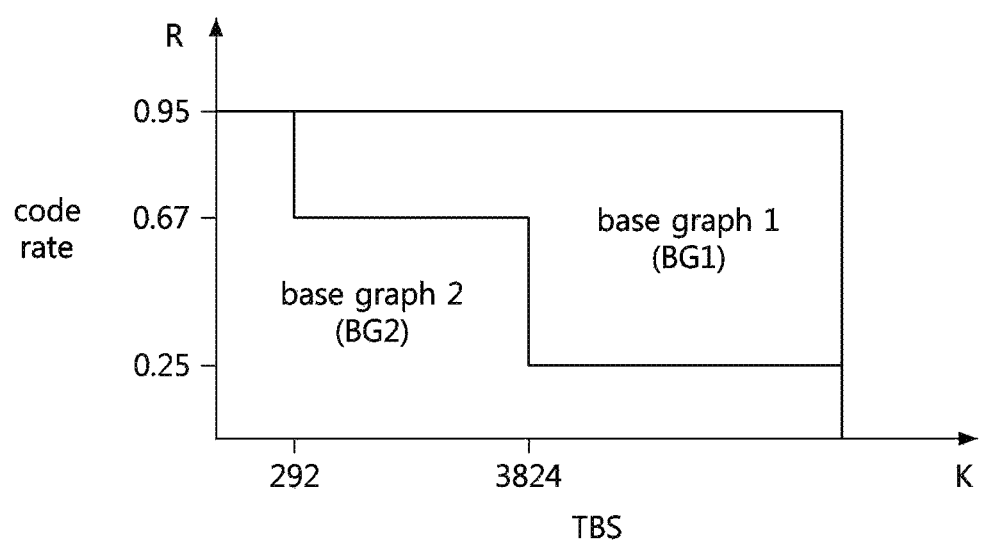
FIG. 8 is a graph for describing a fifth exemplary embodiment of a repetitive transmission method according to the present disclosure.

FIG. 8 is a graph for describing a fifth exemplary embodiment of a repetitive transmission method according to the present disclosure.

Referring to FIG. 8, in the fifth exemplary embodiment of the repetitive transmission method according to the present disclosure, an operation of selecting a base graph of an LDPC code is proposed. Data to be transmitted by a transmitting node of the communication system may be transmitted from a higher layer to a physical layer in form of a TB. The TB may be divided into CBs which are smaller units. Each of the CBs may independently undergo physical layer channel coding. For example, in 3G and 4G LTE communication systems, each of the CBs may be encoded in a turbo code scheme. Meanwhile, in the 5G NR communication system, CBs may be encoded using an LDPC code scheme.

In an exemplary embodiment of the communication system, an LDPC code may have two base graphs identified as a first base graph (i.e., base graph 1) and a second base graph (i.e., base graph 2). For example, the first base graph may be used for transmission of a relatively large TB. On the other hand, the second base graph may be used for transmission of a relatively small TB. The two base graphs may be selectively used according to predetermined selection criteria. The selection of the base graph may be performed based on a TBS or a target code rate corresponding to an MSC index. For example, if the TBS is less than a first configuration size, the target code rate is less than a first configuration code rate, or the TBS is less than a second configuration size and the target code rate is less than a second configuration code rate, the second base graph may be selected. In other cases, the first base graph may be selected.

According to the first exemplary embodiment of the TBS calculation method in the communication system, the TBS may be calculated based on REs occupied by a single data channel. Here, when data is repeatedly transmitted through one or more data channels based on the indicated MCS index, the effective code rate calculated by considering all data channels at the receiving node receiving all of the data channels may have a lower value than the target code rate corresponding to the indicated MCS index. In this case, the TBS may be calculated based on the REs occupied by the single data channel, and the base graph of the LDPC code may be selected based on a code rate R' calculated based on the REs occupied by all data channels used for repetitive transmissions. In this case, although the effective code rate of the single data channel is calculated to be high, the effective code rate in consideration of all the data channels used for repetitive transmissions may be decreased. Through this, the rate at which the second base graph is selected may be increased. As a result, a coding gain can be increased.

In the fifth exemplary embodiment of the repetitive transmission method according to the present disclosure, a code rate R' used for selecting a base graph may be defined as in Equation 5.

$$R' = \frac{R_{MCS} \times N_{RE\_TBS}}{N_{RE\_Total}} \qquad \text{[Equation 4]}$$

Here, $R_{MCS}$ may mean a target code rate corresponding to an MCS index on the MCS index table. $N_{RE\_TBS}$ may mean the number of REs used in the calculation of the TBS. $N_{RE\_Total}$ may mean the number of REs occupied by all the data channels used for repetitive transmissions. Referring to Equation 5, the code rate calculated based on the single data channel may be normalized by a ratio of REs occupied by all the data channels used for repetitive transmissions to REs occupied by the single data channel. Through this, the code rate used for selecting the base graph may be reduced, and as a result, the coding gain can be increased.

In the present specification, the first to fifth exemplary embodiments of the repetitive transmission method according to the present disclosure have been described with reference to the transmission operations by the transmitting node for convenience of description. However, the exemplary embodiments of the present disclosure are not limited thereto. For example, the exemplary embodiment of the present disclosure may be extended and applied to the reception operations in the receiving node that receives the repeatedly transmitted signals based on the first to fifth exemplary embodiments of the repetitive transmission operation according to the present disclosure. The repetitive transmission described in the present specification may be same or similar with repetition transmission. The first to fifth exemplary embodiments of the repetitive transmission method described in the present specification may be applied to repetition transmission.

According to the above-described exemplary embodiment of the present disclosure, when bits are repeatedly transmitted more than once based on the same RV value, the respective bits may be mapped to be transmitted through bit channels having different reliability levels as much as possible for the respective transmissions.

According to the above-described exemplary embodiment of the present disclosure, data can be transmitted and received with high reliability even when a certain data channel existing in the repetitive transmission period is split or the number of OFDM symbols occupied by the data channel is smaller than a configured or preconfigured value.

According to the above-described exemplary embodiment of the present disclosure, when repetitive data transmission from a transmitting node to a receiving node is not smooth, the transmitting node can perform data transmission more easily by variably applying a modulation order or an MCS index.

According to the above-described exemplary embodiment of the present disclosure, an advantageous TBS calculation method may be selectively applied according to a communication situation. Therefore, the reliability and efficiency of the communication system can be improved.

According to the above-described exemplary embodiment of the present disclosure, an advantageous base graph may be selectively applied according to a communication situation. Therefore, the reliability and efficiency of the communication system can be improved.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for repetitive transmission of a transport block, performed by a first communication node, the method comprising:

generating a first modulation symbol by performing a modulation operation on a first bit sequence of the transport block for a first transmission among a plurality of transmissions of the repetitive transmission;

transmitting the first modulation symbol to a second communication node on a first data channel;

generating a second bit sequence for a second transmission among the plurality of transmissions by changing an arrangement order of bits included in the first bit sequence according to a preconfigured rule;

generating a second modulation symbol by performing the modulation operation on the second bit sequence; and transmitting the second modulation symbol to the second communication node through a second data channel which is different from the first data channel, wherein the preconfigured rule is based on an offset defined based on an order of each transmission among the plurality of transmissions and a modulation order of the modulation operation.

2. The method according to claim 1, wherein in the generating of the second bit sequence, the arrangement order of the bits is changed so that each bit included in the second bit sequence has reliability different from reliability thereof in the first bit sequence.

3. The method according to claim 1, wherein each of the first bit sequence and the second bit sequence includes m bits, the m bits in the first bit sequence include x most significant bits (MSBs) and y least significant bits (LSBs), the x MSBs of the first bit sequence are configured as LSBs of the second bit sequence according to the preconfigured rule, the y LSBs of the first bit sequence are configured as MSBs of the second bit sequence according to the preconfigured rule, each of m, x and y is a natural number, and m is a multiple of the modulation order of the modulation operation.

4. The method according to claim 3, wherein x=2 and y=2.

5. The method according to claim 1, further comprising generating an n-th bit sequence for an n-th transmission among the plurality of transmissions by changing the arrangement order of the bits included in the first bit sequence according to the preconfigured rule.

6. A method for repetitive transmission of a transport block, performed by a first communication node, the method comprising:

selecting a first bit sequence from the transport block;

transmitting, to a second communication node, a first modulation symbol generated by performing a modulation operation on the first bit sequence on a first data channel;

selecting a second bit sequence from the transport block; and transmitting, to the second communication node, a second modulation symbol generated by performing a modulation operation on the second bit sequence on a second data channel, wherein the selecting of the second bit sequence is performed based on a comparison between an amount of radio resources occupied by the first data channel and a first configuration value.

7. The method according to claim 6, wherein the selecting of the second bit sequence comprises:

identifying the amount of radio resources occupied by the first data channel;

when the amount of radio resources occupied by the first data channel is not less than the first configuration value, selecting bits located after the bits selected as the first bit sequence in the transport block as the second bit sequence.

8. The method according to claim 6, wherein the selecting of the second bit sequence comprises:
identifying the amount of radio resources occupied by the first data channel;
when the amount of radio resources occupied by the first data channel is less than the first configuration value, setting a first configuration redundancy version (RV); and
selecting the second bit sequence based on the first configuration RV.

9. The method according to claim 8, wherein in the setting of the first configuration RV, the first configuration RV is set based on a start position of the first bit sequence at the selecting of the first bit sequence and a number of bits transmitted through the data channel.

10. The method according to claim 6, wherein the amount of radio resource occupied by the data channel means a number of orthogonal frequency division multiplexing (OFDM) symbols occupied by the data channel.

11. A method for repetitive transmission of a transport block, performed by a first communication node of a communication system, the method comprising:
performing a modulation operation on a first bit sequence selected from the transport block;
generating a first modulation symbol based on a comparison between an effective code rate calculated based on the modulation operation on the first bit sequence and a preconfigured first configuration code rate;
transmitting, to a second communication node, the first modulation symbol on a first data channel;
generating a second modulation symbol by performing a modulation operation on a second bit sequence selected from the transport block; and
transmitting, to the second communication node, the second modulation symbol on a second data channel.

12. The method according to claim 11, wherein the generating of the first modulation symbol comprises:
comparing the calculated effective code rate with the first configuration code rate;
when the calculated effective code rate is greater than the first configuration code rate, identifying a first modulation order applied to the modulation operation on the first bit sequence;
defining a second modulation order having a value greater than the first modulation order;
selecting a first modified bit sequence based on the second modulation order; and
generating the first modulation symbol by performing a modulation operation on the first modified bit sequence based on the second modulation order.

13. The method according to claim 12, wherein the defining of the second modulation order comprises:
recalculating the effective code rate based on modulation orders greater than the first modulation order among modulation orders supported by the communication system; and
defining a smallest modulation order among the modulation orders at which the recalculated effective code rate is smaller than the first configuration code rate as the second modulation order.

14. The method according to claim 12, wherein the generating of the first modulation symbol comprises defining a modulation symbol generated according to the modulation operation on the first bit sequence as the first modulation symbol when the calculated effective code rate is less than or equal to the first configuration code rate.

15. The method according to claim 12, wherein the generating of the second modulation symbol is performed based on the second modulation order when the calculated effective code rate is greater than the first configuration code rate, and performed based on the first modulation order when the calculated effective code rate is equal to or less than the first configuration code rate.

* * * * *